March 27, 1934. P. B. HOYE 1,952,436
SWITCH
Original Filed Dec. 29, 1930 10 Sheets-Sheet 1
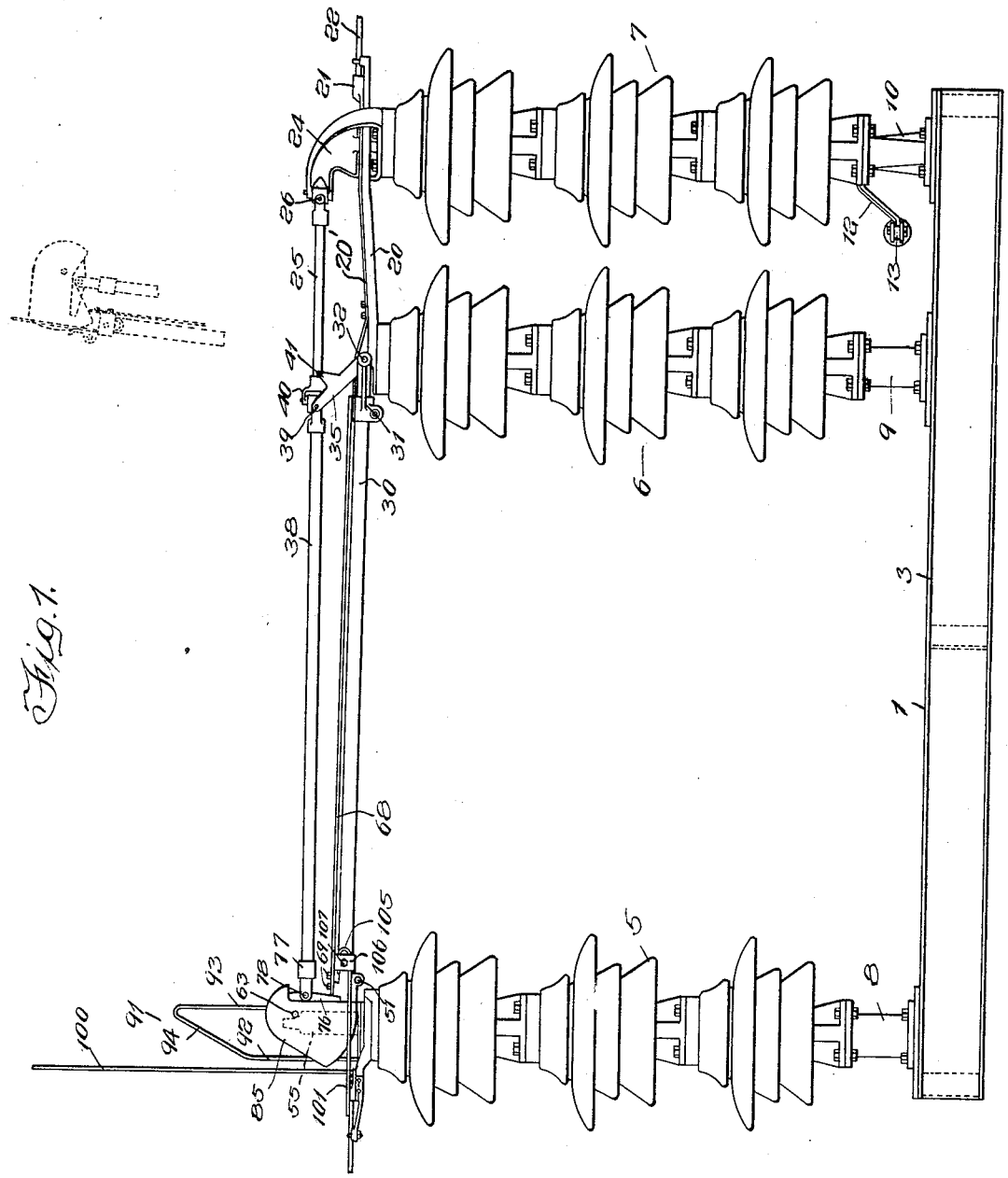
Inventor
Peder B. Hoye March 27, 1934. P. B. HOYE 1,952,436
SWITCH
Original Filed Dec. 29, 1930 10 Sheets-Sheet 2
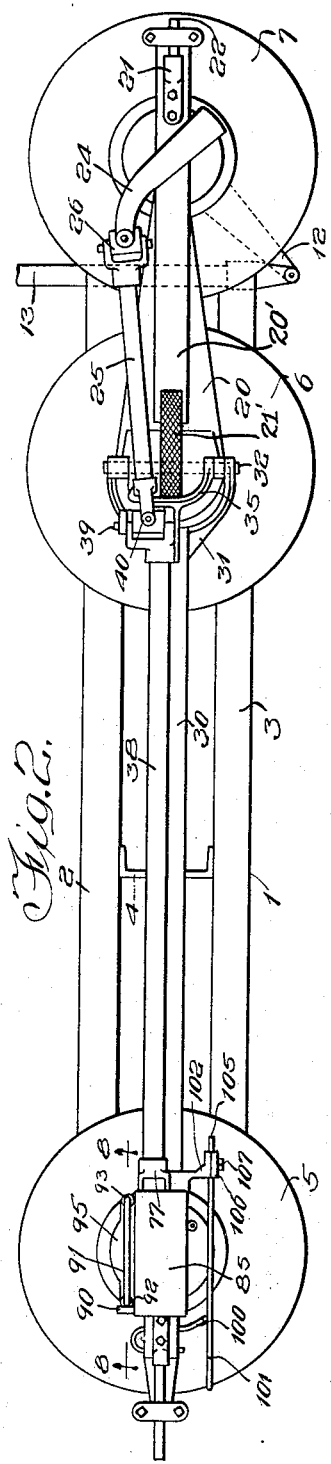
Inventor:
Peder B. Hoye March 27, 1934. P. B. HOYE 1,952,436
SWITCH
Original Filed Dec. 29, 1930 10 Sheets-Sheet 3
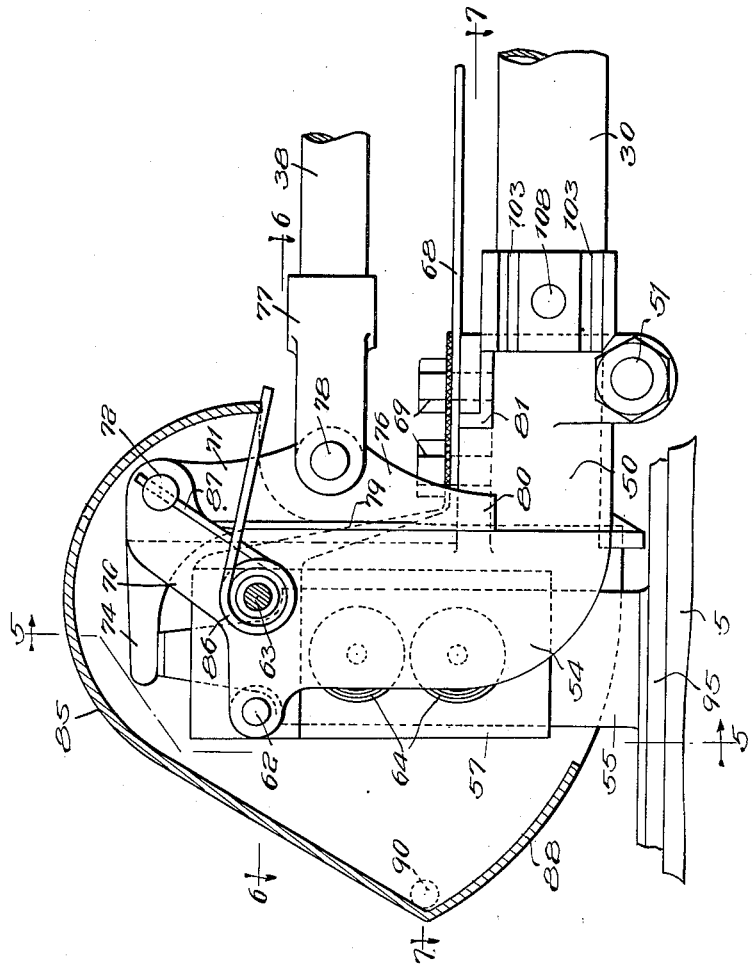
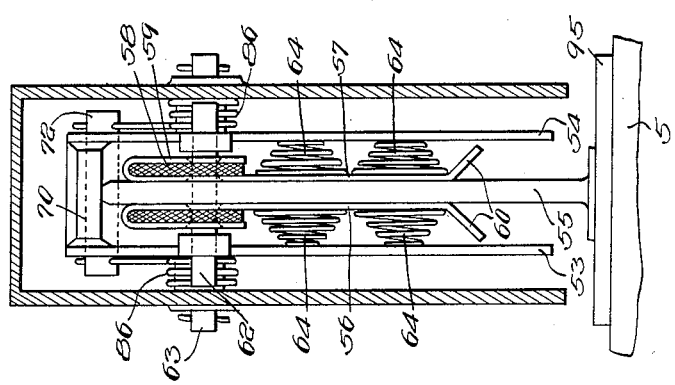
Inventor:
Peder B. Hoye
Witness:
William P. Kilroy March 27, 1934.   P. B. HOYE   1,952,436
SWITCH
Original Filed Dec. 29, 1930   10 Sheets-Sheet 4

Witness:
William P. Kilroy

Inventor:
Peder B. Hoye
By Brown, Jackson, Boettcher & Dienner
Att'ys.

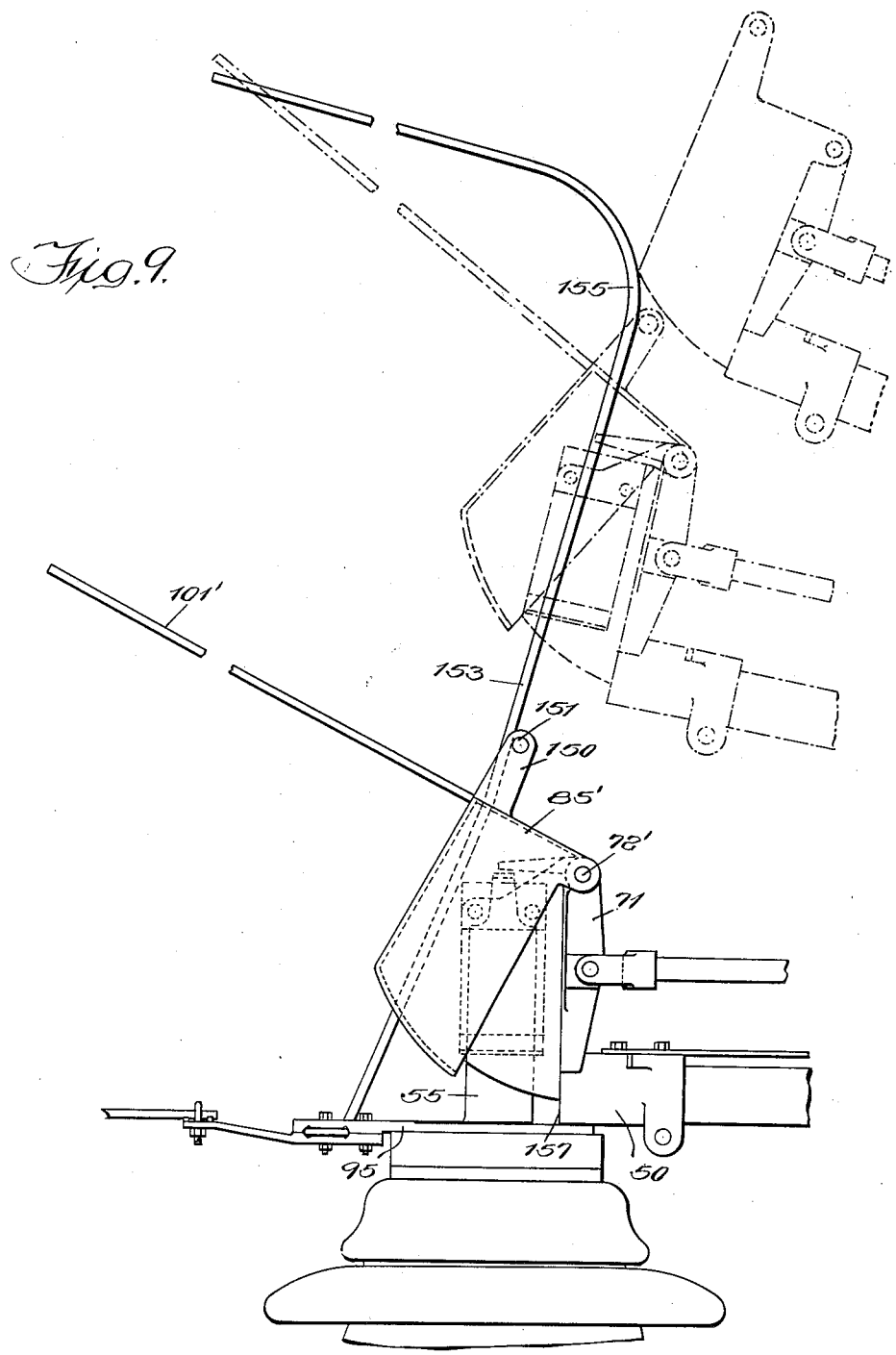

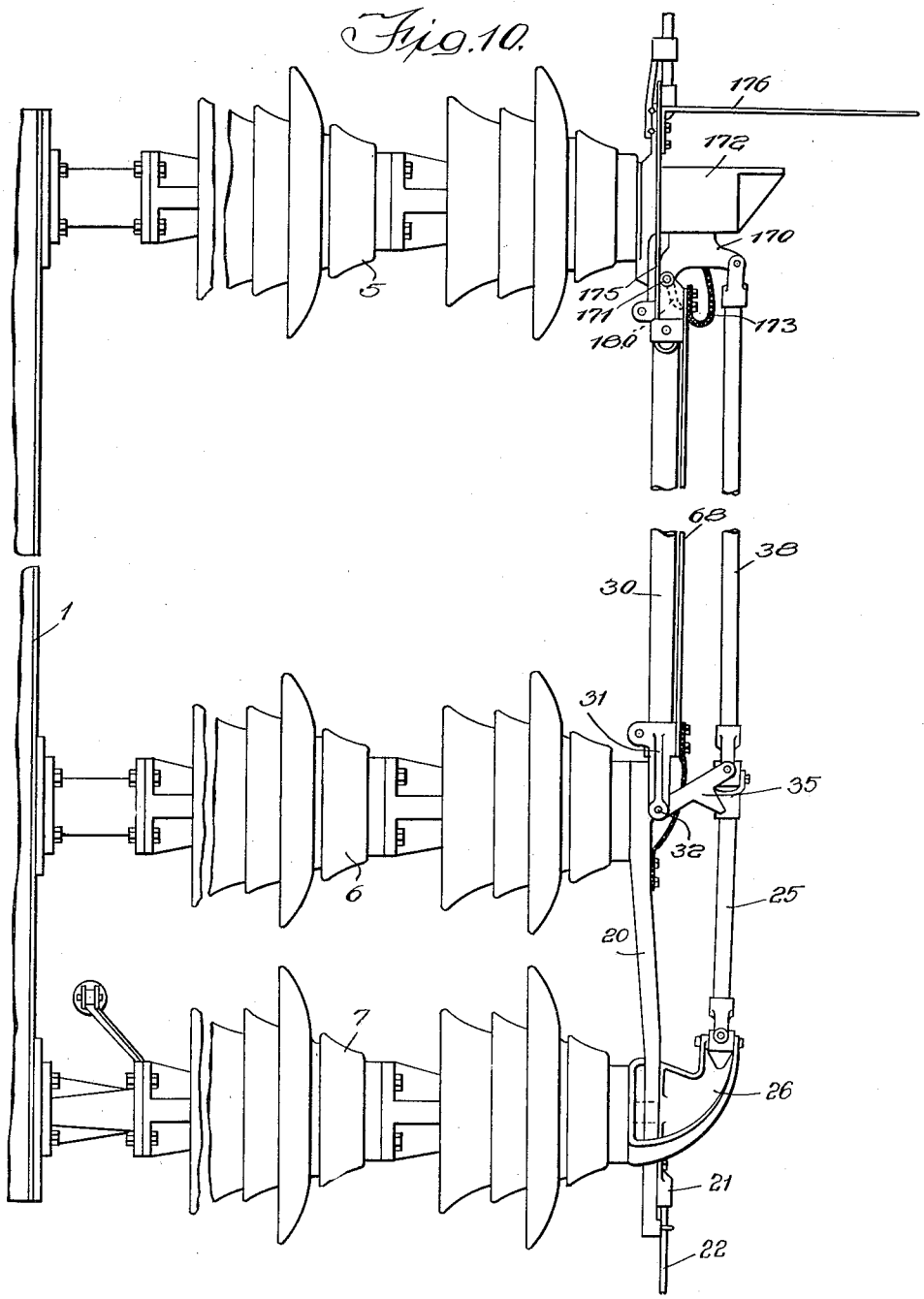

March 27, 1934.  P. B. HOYE  1,952,436
SWITCH
Original Filed Dec. 29, 1930   10 Sheets-Sheet 7
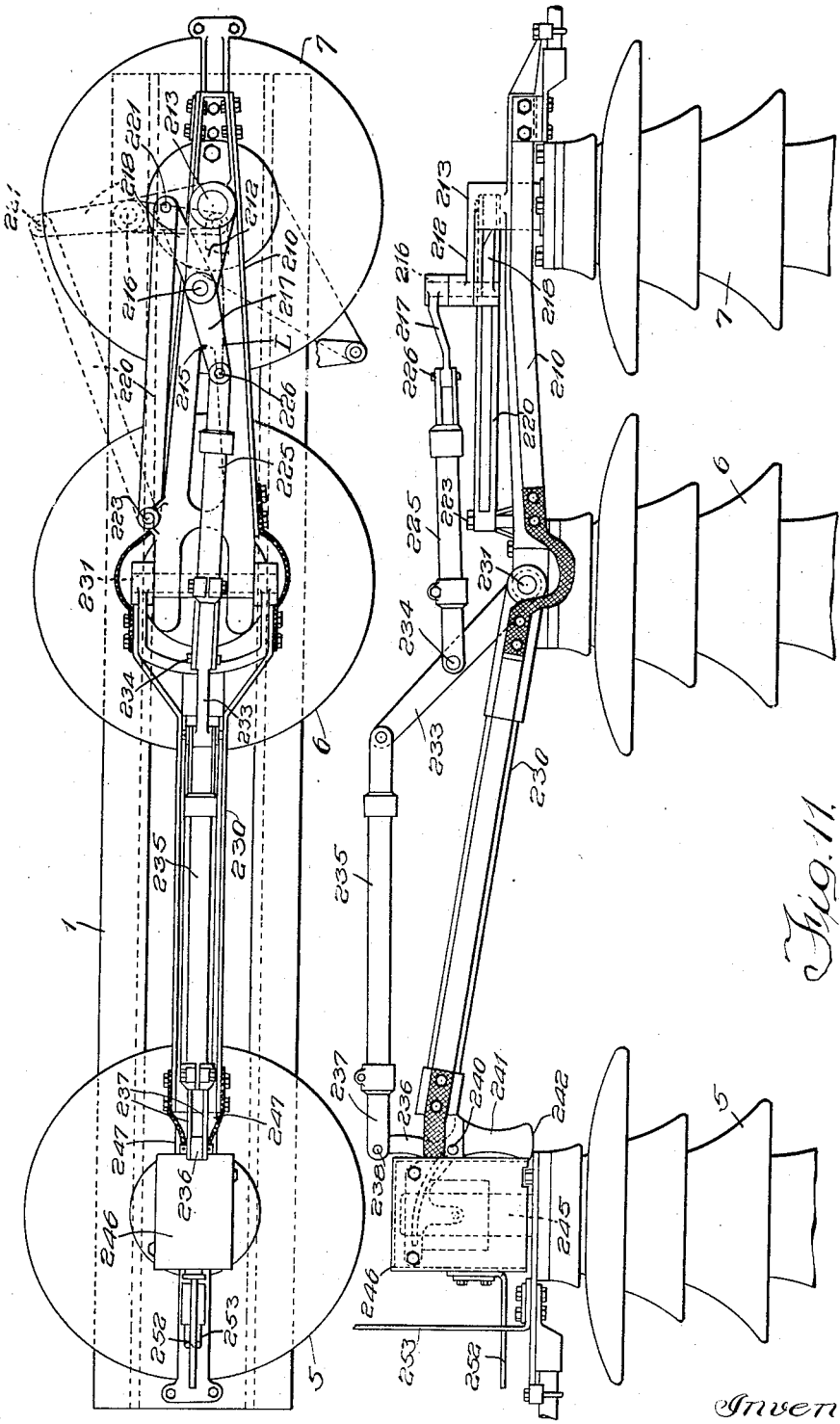

March 27, 1934.   P. B. HOYE   1,952,436
SWITCH
Original Filed Dec. 29, 1930   10 Sheets-Sheet 8

Witness:
William P. Kilroy

Inventor:
Peder B. Hoye
By Brown Jackson Boettcher Dienner
Attys

March 27, 1934.   P. B. HOYE   1,952,436
SWITCH
Original Filed Dec. 29, 1930   10 Sheets-Sheet 9
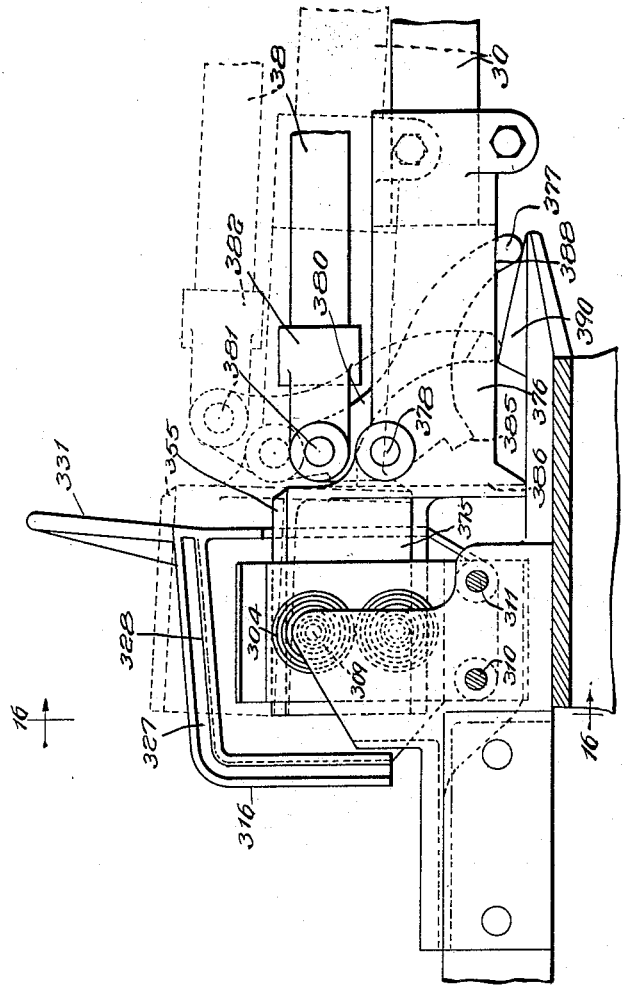
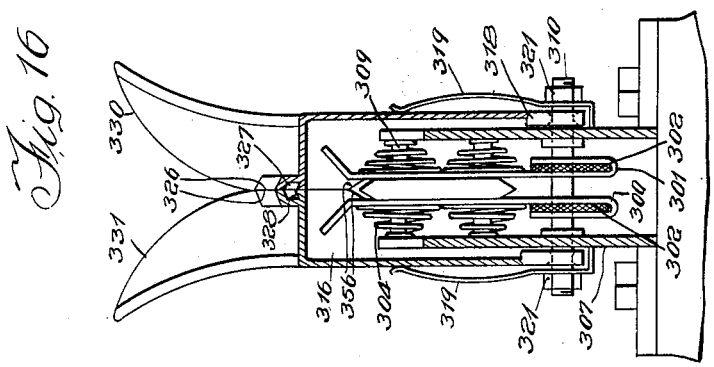
Inventor
Peder B. Hoye March 27, 1934.    P. B. HOYE    1,952,436
SWITCH
Original Filed Dec. 29, 1930    10 Sheets-Sheet 10
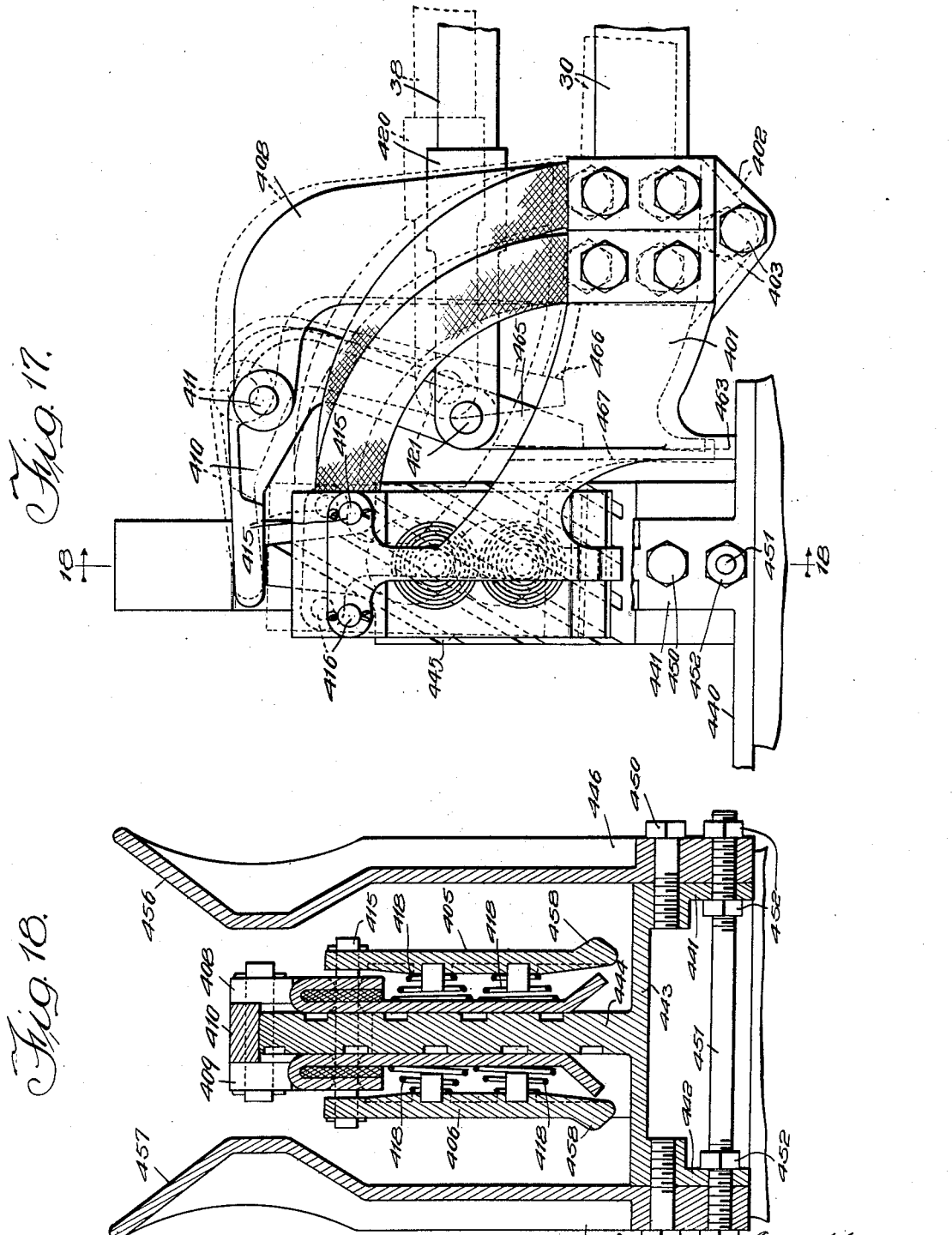
Witness.
William P. Kilroy
Inventor
Peder B. Hoye.
By Brown Jackson Boettcher & Dienner
Attys Patented Mar. 27, 1934

1,952,436

UNITED STATES PATENT OFFICE 1,952,436

SWITCH

Peder E. Hoye, Maywood, Ill., assignor to Electrical Engineers Equipment Co., Melrose Park, Ill., a corporation of Illinois Application December 29, 1930, Serial No. 505,249
Renewed August 23, 1933

22 Claims. (Cl. 200—48)

This invention relates to electric switches in general and more particularly to such switches as are used for disconnect purposes and are known in the art as disconnect switches and of the type shown in the application of Ernst Jacobs, Serial No. 502,391, filed December 17, 1930. While not specifically limited thereto, this invention is particularly useful on high voltage disconnect switches or switches which are used on medium voltages but carry large currents.

Switches of the kind here contemplated generally comprise a supporting base upon which is mounted a contact supporting insulator and one or more insulators for supporting the switch blade. With increasing voltages, as have come into use in modern times, the required spacing of the contact and the blade from one another and the spacing of both from the supporting base has become very great. In many cases it is necessary to make the insulators upwards of ten feet in length and the switch blade may have to be made more than twelve feet long in order to secure the desired spacing of the contact and the blade from the supporting base and from one another when the switch is open. The insulator stacks are generally made of porcelain or other frangible material and therefore are not able to withstand high stresses, especially in bending. Disconnect switches are infrequently operated, being required to stand perhaps for years in a given position, during which time they are exposed to all sorts of adverse weather. When the switch is closed the contact and the end of the switch blade in engagement therewith may become corroded together. The parts may also become covered with sleet or ice. The difficulty of swinging a blade over twelve feet long and mounted upon an insulator over eight feet long, when the free end of the blade is held to its contact by ice, sleet, or corrosion may be readily appreciated. Unless means is provided to break the bind between the two contacts that are in engagement with one another any turning effort applied to the blade actuating insulator may cause cracking of the insulator. This situation is aggravated by the fact that in switches carrying an appreciable current there must be considerable contact pressure between the co-operating contacts in order to reduce the resistance at the contacts. Even excluding any binding action that may be present due to corrosion, freezing or the like, a considerable effort is normally required to overcome the friction inherently present between the contacts due to the high pressure of contact. Considering the fact that the contacting engagement between the switch blade and the switch contact is obtained at one end of the switch blade and that the force for swinging the blade to the open position is applied to the other end of the blade it may be readily seen that the force necessary to swing the blade becomes appreciable. Since this force must be applied through an actuating insulator which may be over eight or ten feet long and which is inherently incapable of withstanding high mechanical stresses it is apparent that some form of mechanism must be provided which will reduce the effort initially required to separate the two contacts. Various forms of ice breaking movements have heretofore been provided. In the main, these have involved the exertion of either a longitudinal or a twisting motion of the blade prior to the swinging thereof away from the contact. This is not quite satisfactory in that it induces certain cantilever or bending stresses in the blade actuating insulator. In addition, if the bind between the blade and the stationary contact is strong, then the contact may be drawn with the blade in its longitudinal movement, thus causing bending and possible cracking of the contact supporting insulator.

It is one of the objects of the present invention to provide a switch mechanism of the class described which will have a powerful ice breaking movement obtained by means which provide a great mechanical advantage, so that a small force applied to the switch actuating insulator will produce a relatively great force to produce the initial switch opening movement. It is a further object of the present invention to produce the initial switch opening movement in such a manner that there is substantially no force tending to draw the contact supporting insulator toward the switch blade supporting insulator in the event that the blade and the contact are frozen together upon the initiation of the switch opening movement. I accomplish this end, in several of the embodiments of my invention herein illustrated, by mounting a cam or the like upon the contacting end of the switch blade and actuating this cam to exert a powerful camming action, tending to move the switch blade in a direction axially of the contact supporting insulator and force the switch opening movement. The force applied by the camming means is preferably in a direction substantially axially of the contact supporting insulator and it induces a compressive stress in the insulator. Since the material of which the insulator is made is capable of withstanding rather great compressive stresses, this is not objectionable. On the other hand, such material has a comparatively low tensile strength as well as a comparatively small strength in bending. This camming action, therefore, is of a distinct advantage in producing the initial switch opening movement in that it does not induce any bending or tensile stresses in the insulator. As stated above, the camming means is arranged to obtain a very great mechanical advantage in camming the contacts apart, whereby a comparatively small force need be applied at the switch actuating insulator in order to produce a relatively powerful force to cam the contacts apart. After the bind between the contacts has been broken, the switch blade is swung away from its cooperating contact to open the switch and to increase the striking distance between the contacts. The arrangement may be such that the blade is given a slight movement during the ice breaking action or the blade may be provided with a hinged contact making member which is moved with respect to its cooperating contact mounted upon the stationary insulator to shear the bind between them, while the switch blade itself remains stationary.

I have also conceived the possibility of producing this powerful ice breaking movement without providing a special camming member in addition to and separate from the contact making member, while maintaining the advantages above enumerated. The switch blade may carry a contact making member which is pivoted thereto and is swung thereby into and out of contacting engagement with the cooperating contact mounted upon the stationary insulator. This contact may be arranged to constitute the cam means for breaking the bind between the contact making members. Prior to the swinging of the blade to its open position the contact mounted thereon may be rocked to break the bind that may exist between it and the cooperating contact on the stationary insulator. Prior to the swinging of the blade the contact making member is rocked through a relatively great angle and about a very short radius, said rocking action tending to shear the bind between the two engaged contacts while avoiding any bending stresses in the contact supporting insulator and also avoiding any tendency for the insulators on the opposite sides of the switch to be drawn together.

It is a further object of the present invention to provide an improved mechanical arrangement for swinging the switch blade so as to reduce the stresses induced in the insulators as well as in the blade even after the blade is free of the stationary contact. The blade is pivoted at one end and is adapted to be actuated by a force applied thereto at its opposite end. An actuating member extends substantially parallel to the blade for substantially the entire length of the blade and applies its actuating force close to the free or contacting end of the blade. This actuating member is connected to the blade by means of a link or the like and has relative movement with reference to the blade during the ice-breaking motion. Thereafter the actuating member is caused to move as a rigid integral body with the switch blade, this actuating member forming a truss structure with the blade. The arrangement is such that the blade is placed only in compression whereby the same can sustain an appreciably greater load than was possible with switches of the kind heretofore used wherein the actuating force was applied to the blade adjacent its pivot, thereby inducing a large cantilever stress in the blade. As a result of the present arrangement the blade may be made of appreciably smaller cross sectional area than was necessary in the blades of the past. This reduction in the weight of the blade and in the corresponding weight of any ice or sleet that may collect upon the blade is appreciable.

It is a further object of the present invention to provide a mechanical arrangement for reducing the side thrust upon the switch blade supporting insulator in a switch of the kind described. The blade is mounted upon a stationary insulator and is actuated by a rotary insulator adjacent and parallel thereto. A crank or the like is rotated by the rotary insulator in a plane at right angle to the plane of movement of the switch blade and also at right angle to the axis of the stationary insulator. A linkwork connects this crank with the switch blade. One end of this link moves in the plane of the blade and the other end of this link moves with the crank and in a plane at right angle to the plane of the blade. This may produce a considerable side thrust upon the stationary insulator, this side thrust increasing as the angularity of this crank increases with respect to the plane of motion of the switch blade. I provide an offset in the connection between this link and the switch blade whereby this angularity is appreciably reduced, thereby appreciably reducing the side thrust.

It is a further object of the present invention to provide an improved sleet hood for an electric switch. In one form of my invention this hood comprises two pivotally mounted parts that are held in abutment with one another to form a shutter for the contact that is mounted within the hood. Spring means are provided for normally urging the two hood members into abutment to thereby close the contact, said hood members being provided with means for spreading them apart as the switch blade is moved to the open or closed position. When the switch blade moves to its full closed position the hood members swing back into abutment with one another to fully enclose the contacting end of the blade as well as of the stationary contact. The top of the hood, adjacent the abutting end of the two members, is suitably inclined to provide for drainage. In addition, a drain trough is provided at the top of the hoods, on the inside thereof and immediately below the abutting ends of the two hood members. This drain trough will catch any moisture that may come through the space between the two abutting hood members. As a result of this arrangement no moisture whatsoever can reach the contacting ends of the cooperating contact members when they are in the closed position, thereby preventing the formation of even a thin film of ice or sleet thereover.

In another form of my switch I provide a hood which comprises a single member that is pivoted upon the switch blade and is maintained, by a spring or the like, in a position completely enclosing the contact at the end of the blade when the switch is open. As the switch approaches its closed position the hood is swung somewhat to permit engagement between the operating contact. To accomplish this the hood is provided with an outwardly extending pin that engages an arcing horn mounted adjacent the stationary contact.

The attainment of the above and further objects of the present invention will be apparent from the following specification taken in con- In the drawings:

Figure 1 is a side view of a switch embodying the principles of my invention;

Figure 2 is a top view of the switch shown in Figure 1;

Figure 3 is a fragmentary view showing the manner of mounting of the switch blade;

Figure 4 is an enlarged fragmentary view showing the end of the switch blade and the manner whereby the same engages the stationary contact, the outer side of the sleet hood being removed;

Figure 5 is a fragmentary sectional view taken along the line 5—5 of Figure 4 and looking in the direction of the arrows;

Figure 8 is a fragmentary sectional view showing the manner of adjusting the sleet hood guiding horn, said view being taken along the line 8—8 of Figure 2;

Figure 9 is a fragmentary view showing a portion of a switch wherein the sleet hood is mounted in a somewhat different manner from that shown in the switch of Figure 1;

Figure 10 is a fragmentary view of a vertically mounted switch employing a sleet hood of a somewhat different construction from that shown in Figure 1;

Figure 11 is a side view of still another form of switch;

Figure 12 is a top view of the switch shown in Figure 11;

Figure 15 is a fragmentary view corresponding to Figure 13 and showing a form of switch wherein the contacting portion of the blade is rigid with the blade;

Figure 16 is a sectional view taken along the line 16—16 of Figure 15;

Figure 17 is a view of a portion of a switch employing no sleet hood; and

Figure 18 is a view taken along the line 18—18 of Figure 17.

Figure 6:
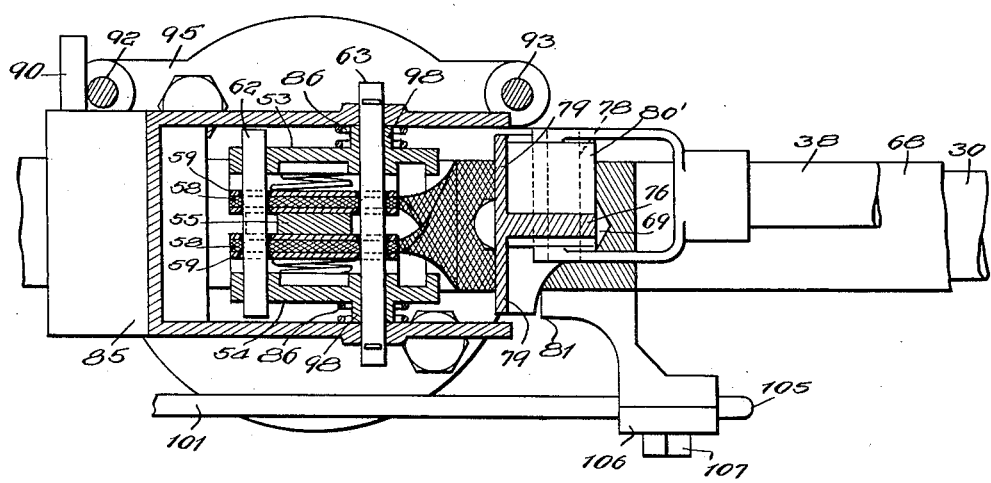
Figure 6 is a sectional view taken along the line 6—6 of Figure 4 and looking in the direction of the arrows.
Figure 7:
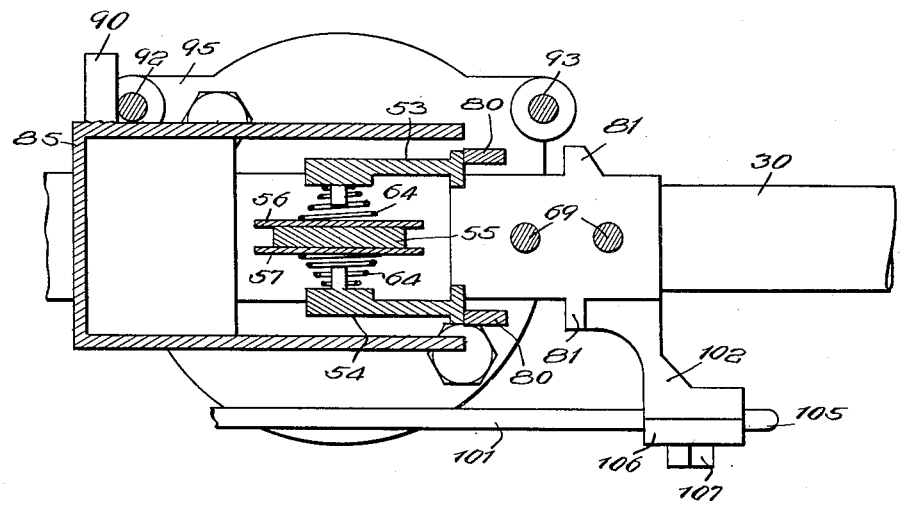
Figure 7 is a sectional view taken along the line 7—7 and looking in the direction of the arrows.

Reference may now be had more particularly to Figures 1 to 8 inclusive, which show one form of switch embodying the principles of my invention. The switch comprises a base 1 of standard construction, said base comprising a pair of outwardly facing channel sections 2 and 3 suitably secured together in spaced relationship by means of channel members 4. A pair of insulators 5, 6 and 7 are mounted upon the base 1 in any preferred manner. The insulators 5 and 6 are stationary, being rigidly supported with reference to the frame by means of supports 8 and 9 that are secured to the frame 1. The insulator 7 is rotatably mounted upon the frame 1 by means of a bearing structure 10, of any preferred form, so as to permit rotation of the insulator 7. The insulator 7 is adapted to be oscillated through a limited angle to actuate the switch to the open or closed position and for this purpose there is provided a crank 12 which is suitably secured to the rotatable structure and which is adapted to be oscillated by means of a rod 13 that is reciprocated for swinging the insulator. The actuating rod 13 is adapted to be moved in a manner well known in the art. The switch shown in Figure 1 is generally mounted for gang operation, there being three such switches in a three-phase system, one switch being provided for each phase. The three switches are generally mounted side by side and the actuating rod 13 extends through all of the switches and is connected to each of them for operating them. This much of my improved switch structure is well known in the art and, insofar as the present invention is concerned, may take on any preferred form.

A brace 20 extends between the tops of the insulators 6 and 7 for bracing them against one another. A suitable bearing is provided between the brace 20 and the top of the insulator 7 so as to permit rotation of the insulator without producing any rotation in the brace. Thus the brace prevents spreading of the tops of the insulators 6 and 7 from one another. This brace also supports a line terminal 21 to which a line 22 is connected for extending a circuit to the switch. The brace 20 together with a conducting bar 20' which may be provided at the top thereof, constitute a bus for extending the circuit from the line terminal 21. A flexible conductor 21' is provided for extending the circuit around the blade hinge to be presently described.

A crank 24 is rigidly mounted upon the top of the insulator 7 so as to be rotated thereby and thereby actuate the switch. The free end of the crank 24 has connected thereto an actuating arm 25 by means of a knuckle 26 that permits a universal motion between the actuating arm 25 and the crank 24.

A switch blade 30 is supported in a blade hinge 31 that is hinged to the brace 20 by means of a pin 32. For this purpose the hinge 31 is provided with a pair of arms 33—34 that are adapted to embrace the brace 20.

A blade lever 35 which is also provided with a pair of arms, indicated at 36 and 37, is pivoted about the pin 32, said arms lying between a pair of flanges upon the brace member 20. A switch blade operating arm or pull bar 38 is pivoted to the blade lever 35 by means of a pin 39. The operating arm 25 is also pivoted to the blade lever 35 by means of a universal knuckle 40. It is thus apparent that upon rotating the insulator 7 the crank 24 will be rotated, thus causing the arm 25 to swing the blade lever 35 and thereby pull the operating or pull rod 38 to the right as seen in Figure 1. This produces an actuation of the switch blade in a manner to be presently set forth. It may be sufficient to here state that a coiled spring 42 is provided for counterbalancing the weight of the blade 30 and thereby facilitate the actuation of the switch. The blade lever 35 is provided with a projecting portion 41 that abuts against the brace member 20 when the switch has been swung into its full open position, thereby limiting the extent of swing of the switch blade.

Reference may now be had to Figures 4 and 5 for an understanding of the construction at the contacting end of the switch blade. The blade 30 is of a tubular cross section and has secured to the free end thereof a sleet hood and contact supporting structure indicated at 50. This structure includes a split portion which is adapted to embrace the blade 30 and which is firmly clamped thereto by means of a bolt 51. The sleet hood and contact supporting structure extends forwardly and upwardly of the switch blade 30 and includes a pair of spaced arms 53 and 54 that support a pair of contact shoes that are adapted to make contact with a contact finger 55 mounted upon the stationary insulator 5. The contact shoes are indicated at 56 and 57 and each comprises a strip of copper or other high current conducting material bent back and compressed upon a flexible copper braid 58 as indicated at 59. The lower portions of the contact shoes are outwardly flared as indicated at 60 in order to constitute a guide for guiding the contact shoes over the contact finger 55. The contact shoes are mounted between the arms 53 and 54 by means of two pins 62 and 63 that extend through the two arms and through the two contact shoes. For this purpose the contact shoes are provided with openings for permitting the pins 62 and 63 to pass, said openings being of larger diameter than the diameter of the pins whereby the contact shoes have a limited amount of freedom of motion to permit the shoes to adjust themselves with reference to the contact 55. Sets of coil springs 64 constantly resiliently press the contact shoes against one another when the switch is open and against the contact finger 50 when the switch is closed. These springs extend between the inner sides of the arms 53—54 and the outer sides of the contact shoes 56—57. The flexible braided conductors 58 that are connected to the respective contact shoes are clamped, at their outer ends, to a copper bar 68 and to the sleet hood and contact support by means of a set of bolts 69. The copper bar 68 extends adjacent and parallel to the switch blade 30 and is provided for the purpose of relieving the switch blade of the necessity of carrying the current that flows through the switch.

Each of the arms 53 and 54 of the sleet hood and contact support 50 is provided with a rearwardly extending ear portion 70. A cam lever 71, in the form of a bell crank, is pivoted between the ear portion 70 by means of a pin 72 that extends through the ear portion and through the cam lever 71. This cam is provided with a forward extending portion 74 that is adapted to bear against the top of the contact finger 55 for forcing the switch blade upwardly as will be more fully set forth as this description proceeds. The lever is provided with a downwardly extending arm 76 to which is pivoted a clevis 77 by means of a pin 78. The operating arm 38 is connected to the clevis and is provided for actuating the lever 71 to thereby actuate the switch. In addition the lever 71 is provided with a pair of plate-like projecting fins 79 which bear against the rear sides of the arms 53 and 54 and thus constitute a closure for preventing the entrance of moisture into the contact structure from the rear thereof when the switch is in its closed position. The lever 71 is provided with a pair of arms 80 at its lower end which embrace the contact supporting structure 50. These arms merge together at the lower side of the sleeve 80' which is embraced by the arms of the clevis 77. When the lever 71 is swung in a counter-clockwise direction as seen in Figure 4, in order to actuate the switch, the arms 80 thereof move to the right as seen in Figure 4 and after a predetermined amount of motion abut against a projecting portion 81 of the sleet hood and contact support 50, thereby limiting the extent of swinging of the cam lever about the pin 72. The purpose of this will be more fully set forth as the description proceeds.

A sleet hood 85 is pivoted upon the support 50 by means of the hinge pin 63. A pair of coil springs 86—86 that are located between the outer sides of the arms 53—54 and the inner side of the sleet hood 85 constantly urge the sleet hood to swing about its pivot 63 so that the sleet hood is always in a position covering the contact making members 56—57 against the entrance of moisture from above. One end of the spring bears against the sleet hood whereas the opposite end 87 extends through an opening in the pin 72, thereby holding that end on said spring rigid with respect to the supporting structure 50. When the switch blade is in its normal open position the bottom 88 of the sleet hood 85 covers the bottom portions 60—60 of the contact shoes and hence it is necessary to swing the sleet hood in a generally clockwise direction as the switch arm 30 approaches its full closed position, in order to permit the contact shoes to make engagement with the contact finger 55. In order to do this the sleet hood is provided with a guiding finger 90 that extends outwardly from the body thereof adjacent the bottom portion of the sleet hood and on one side thereof. A guiding horn 91 which comprises a continuous tube, bent in the manner shown in Figure 1, is mounted upon the stationary insulator 5 for cooperating with the projecting pin 90 to swing the sleet hood to the position shown in Figure 4 as the switch blade approaches its full closed position. The guiding member 91 is bent so as to have two vertically extending portions 92 and 93 and an inclined portion 94. As the switch blade approaches its closed position, the pin 90 first rides along the inclined portion 94 of the guiding member 91 and thereafter it rides along the arm 92. It is during this motion that the sleet hood is swung to the relative position shown in Figure 4. The member 91 is mounted upon the top of the insulator structure 5 in the manner shown more particularly in Figure 8, to which reference may now be had. The lower end of the vertical portions 92—93 of the guiding member 91 is threaded and is mounted in place upon the front contact clip structure 95 by means of two sets of nuts 96—96 and 97—97. The nuts 96—97 constitute a means for adjusting the position of the guiding member 91 and if it is desired to tilt the inclined portion 94 to the right or to the left as the case may be, it is merely necessary to draw down upon one or the other of the two vertical portions 92 or 93. This will determine the position at which opening of the sleet hood 85 commences.

In order to facilitate the assemblage of the sleet hood 85 and the spring 86 over the sleet hood and contact support 50, the arm 53 and the arm 54 are provided, on their outer sides, with projecting bosses 98—98 for supporting the spring 86 during the assembling operation. The springs are placed in position about these bosses and the ends 87 of these springs are passed through the opening in the pin 72. The opposite ends of these springs will assume a position somewhat displaced in a counter-clockwise direction from the position shown in Figure 4. While the springs are held upon the projecting members, or bosses, 98, the sleet hood is lowered over the support 50 and thereafter the pin 63 is extended through the aligned openings in the sleet hood and in the bosses 98—98. In the absence of these bosses the springs would not be maintained in position prior to the insertion of the pin 63 in place; hence when the pin 63 would be inserted it would not pass through the springs 86. The provision of the bosses upon the outer faces of the arms 53—54 greatly facilitates the assembly of the sleet hood over the contact arm. After the pin 63 has been inserted in position it may be held in place by means of cotter pins as shown.

An arcing horn 100 is mounted upon the front contact clip structure 95 and cooperates with a forward extending arcing horn 101 that is bolted or otherwise suitably secured to the sleet hood and contact supporting structure 50. For this purpose the structure 50 is provided with an arm 102 that extends sideward of the structure and is provided with a pair of V-shaped grooves 103 for receiving a bent back portion of the arcing horn 101. The end of the arcing horn 101 is bent back upon itself, as indicated at 105, and the bent portion of the horn is placed in one of the V-shaped grooves 103 and the other portion of the horn is placed in the other groove. Thereafter the arcing horn is bolted in place by means of a plate 106 that is provided with V-shaped grooves corresponding to the grooves 103—103. This plate is bolted into position by means of a bolt 107 that passes through a tapped hole 108 in the member 50. The arcing horn 100 is similarly mounted upon the front contact clip structure 95.

An explanation will now be given of the manner of operation of the switch shown. To actuate the switch to the switch open position the insulator 7 is rotated in a clockwise direction as seen in Figure 2, thereby rotating the crank 24 in a clockwise direction. The arm 25 thus moves the blade lever 35 to the right as seen in Figure 2 or, as seen in Figure 1, in a clockwise direction. The pull bar 38 is thus pulled to the right as seen in Figures 1 and 2 and thereby exerts a pulling force upon the arm 76 of the cam pull lever 71. This lever turns about its pivot 72 and, at its arm 74, exerts a powerful camming force upon the top of the contact finger 55. Considering this contact finger as being stationary it is apparent that upon movement of the pin 78 to the right the lever 71 will fulcrum about the top of the contact finger 55 and force the point of pivot of this lever, namely, the point 72, upwardly. The lever 71 thus acts as a lever of the second class to force the point 72 upwardly, thereby forcing the switch blade to move upwardly since the pivot pin 72 extends between the two arms of the sleet hood and contact supporting structure 50 which is rigidly secured to the switch blade 30. Upon the initial upward movement of the switch blade the bind that may exist between the contact shoes 56—57 and the contact finger 55 is broken, thereby greatly facilitating the further actuation of the switch blade. A moment later the lower portion 80 of the arm 76 of the lever 71 abuts against the projecting portion 81 of the structure 50, thereby preventing further relative movement between the cam lever 71 and the switch blade. At this time the four-link structure comprising the blade 30, the lever 71, the pull rod 38, and the blade lever 35 constitutes a rigid system that is pivoted at 32 and wherein no relative motion between the four links of the system is possible. Upon further actuation of the insulator 7 and the crank 24 the lever 35 continues to swing about the pivot 32 and swings with it the rest of this rigid system. This swinging motion is greatly facilitated by the counterbalancing spring 42 which counterbalances a major portion of the weight of the moving system.

As the switch blade swings to the open position and the pin 90 rides past the guiding horn 91 the sleet hood, the springs 86—86 swing the sleet hood in a generally counterclockwise direction as seen in Figure 4, whereby the lower portion 88 of the sleet hood lies adjacent the edges 80 of the contact shoes so that when the switch blade is swung into its full open position the contact shoes are protected against the entrance of moisture, sleet, or the like, from the side.

The switch is actuated to the switch closing position by a motion substantially the reverse of the opening motion. As the blade approaches its closed position the pin 90 that extends from the side of the sleet hood 85 rides over the inclined portion 94 of the guiding horn 91 and is thus swung to a position such that its open portion is at the bottom so that it can move over the contact finger 55.

It is to be noted that during the switch opening operation the actuating force that is applied to the blade 30 is always applied at the free end of the blade since initially this force is applied at the pin 72 to force the blade upward and thereafter it is applied at the pin 78, which is also adjacent the free end of the blade, for swinging the blade to its full open position. This is of a distinct advantage over that type of switch structure wherein the blade corresponding to the blade 30 is swung to its open position by the application of a force thereto adjacent its pivoted end 32. In such switch structures there is a considerable cantilever stress in the blade and, should there be any bind at the contacting end of the blade, harmful results may follow. Also, in such cases, the blade must be made appreciably heavier to withstand the stresses normally incident to operation of the switch. This means making the switch blade of a larger cross sectional area with the result that there is provided more surface area for the accumulation of ice or sleet. In the present structure less material may be used in the blade 30 due to the lower stresses to which this blade is subjected. The ease with which this switch may be operated is thereby greatly facilitated. This is of considerable importance, especially in high voltage gang operated switches since at least three such switches are generally operated together and, due to the size and weight of the parts, great care must be exercised lest the apparatus become so heavy as to preclude its manual operation.

It is to be noted that the crank 24 rotates in a plane at right angles to the plane of movement of the blade lever 35. As a result there is a certain amount of side thrust upon the blade lever, certain side thrust being transmitted thereto by the operating arm 25. In order to reduce this side thrust it is desirable to provide a construction wherein the operating arm 25 extends as nearly as possible in a direction parallel to the plane of movement of the switch blade. This cannot be truly attained without introducing certain other disadvantages. However, by offsetting the location of the knuckle 40 with reference to the longitudinal center line of the blade, as shown in Figure 2, the angle that the actuating arm 25 makes with the center line of the switch blade is materially reduced during the initiation of the switch opening movement, thereby materially reducing the side thrust at this time. Attention is called to the fact that the operating arm 38 is shown as displaced transversely from the longitudinal center of the blade 30 in order to provide an offset for the knuckle 40. To reduce the stresses in the operating member during operation of the switch blade it is desirable that the blade 30 and the operating arm 38 be maintained substantially parallel to one another during the entire range of operation of the switch. For this reason the end of the operating arm 38 that is adjacent the free end of the switch blade is offset from the switch blade 30 in the same manner as is the end at the knuckle 40. Throughout the entire range of operation of the switch the blade 30 and the operating arm 38 are maintained substantially parallel to one another.

Reference may now be had to Figure 9 which shows a portion of a switch wherein the sleet hood is adapted to be swung out of position covering the contact making shoes in a manner specifically different than that shown in the switch previously described. Except for the manner of mounting the sleet hood and arcing horn, and the manner of actuating the sleet hood, this switch is identical to that shown in Figures 1 and 2 previously described. In this case the sleet hood 85' is pivoted to swing about the pin 72' about which the cam lever 71 swings. Suitable springs, similar to the springs 86—86 of Figure 5, are provided for normally urging the sleet hood to swing in a counter-clockwise direction from the position shown in full lines in Figure 9 so as to completely enclose the contact shoes that are mounted upon the sleet and contact shoe carrier 50. The sleet hood 85' is provided with an upwardly and outwardly projecting arm 150 from which a pin 151 extends transversely of the switch and in a manner similar to the pin 90 of the sleet hood of the switch that was previously described. An arcing horn 153 is mounted upon the front contact clip structure 95 in the usual manner. This arcing horn is bent rearwardly and as the switch blade is moved toward its switch closed position the pin 151 rides along the arcing horn and is pushed backward by it, thereby causing the sleet hood to swing about its pivot pin 72' to the position shown in full lines in the drawings. This permits the contact shoes that are carried by the structure 50 to move over the contact clip 55 to the switch closing position. As the switch blade is swung to the open position the pin 151 rides along the arcing horn 153 being constantly urged to rotate in a counter-clockwise direction about the pin 72' by the spring. As the pin 151 rides over the curved portion 155 of the arcing horn 153 the sleet hood is permitted to swing about its pivot pin 72' and it therefore swings into engagement with abutment 157 upon the structure 50. This limits the permissible swing of the sleet hood 85'. The sleet hood 85' now assumes a position such as shown in the dot-dash lines of Figure 9, and as the blade continues to swing toward its open position it reaches a position where the blade is substantially vertical. In this position the sleet hood completely covers the top portion of the contact shoes and thereby protects them from sleet or dirt. The sleet hood 85' has an arcing horn 101' secured to the side thereof in any preferred manner. This arcing horn cooperates with the arcing horn 153 to by-pass the electric circuit from the main contact shoes and the stationary contact finger 55 as the switch is moving to the open position, thus avoiding any arcing at the main contacts. Any arcing that takes place will take place between the arcing horns.

During the closing operation of the switch the pin 151 will move over the curved portion 155 of the arcing horn 153, thereby causing the sleet hood 85 to be swung about the pin 72' to a position such as shown in full lines of Figure 9, thereby permitting the contact shoes carried by the structure 50 to move over the contact finger 55. The manner of manipulating this switch is identical to that previously described in connection with the switch of Figure 1 and a further description thereof at this point is not deemed to be necessary.

Reference may now be had more particularly to the switch shown in Figure 10. Insofar as this switch is similar to the switch shown in Figure 1, similar reference numerals have been used and a repetition of the description of this portion of the switch and the manner of operation thereof will not be made at this time. This switch is vertically mounted and the sleet hood is mounted upon the stationary contact rather than upon the movable contact, thereby reducing the weight of the moving system. In addition the movable contact structure is of a somewhat modified construction from that shown in the switch of Figure 1. The stationary insulators 5 and 6 and the rotary insulator 7 are mounted upon the base 1 in the manner of the corresponding insulators of the switch of Figure 1. The structure supported by the insulators 6 and 7 and the manner of operation thereof is identical with that previously described. A contact 170 is mounted upon the switch blade 30 by means of a pivot pin 171. The contact 170 comprises a substantially flat copper member that is adapted to move between a pair of contact jaws mounted upon the stationary insulator 5 and protected by a hood 172. A flexible braided copper conductor 173 extends from the copper bar 68 to the contact thereby relieving the pivotal connection 171 of any duty as a current carrying member. It is to be noted that in this figure I have illustrated a switch wherein the conducting bar 20' of Figure 2 is omitted. As a result, the brace member 20 alone acts as a bus bar for extending the circuit from the terminal 21 that is engaged by line 22. It is also to be noted that there is provided a flexible conductor between the member 20 and the member 68, thereby relieving the blade hinge of any duty as a current carrying member.

An arcing horn 175 is mounted upon the switch blade 30 in the usual manner and cooperates with an arcing horn 176 mounted upon the stationary contact supporting structure, to prevent arcing between the main contacts.

The sleet hood 172 may be of any approved construction and acts as a housing for the contacts mounted therein. This hood is open at the bottom and open at the right hand side as seen in Figure 10, so as to permit the contact 170 to move into and out of the same. The hood is provided with an overhanging portion that effectively prevents the entrance of sleet or moisture into the same even during strong wind storms. The sides of the sleet hood at the overhanging portion are outwardly divergent in order to facilitate the guiding of the contact 170 into the housing.

To operate the switch, the insulator 7 is rotated thereby actuating the pull rod 38 in a manner such as has been previously described. During the switch opening operation the downward movement of the pull rod 38 causes the switch contact 170 to swing about its pivot 171 through a limited angle. This produces a powerful shearing force that tends to shear any bind that may exist between the contact 170 and the stationary contact mounted within the housing 172. After a small amount of this movement, an abutment 180 that is formed integrally with the contact 170 and extends within the tubular blade 30 abuts against the inner side wall of the blade and thereby prevents further turning of the contact 170 with reference to the blade. Further pulling upon the pull rod 38 causes the contact 170 and the switch blade 30 to move as an integral unit about the pivot 32 all in the same manner as has been previously described in connection with the switch shown in Figure 1.

Reference may now be had more particularly to Figures 11 and 12 wherein I show a somewhat different form of switch and a different form of operating mechanism therefor. The switch comprises a pair of stationary insulators 5 and 6 and a rotatable insulator 7, said insulators being mounted upon a switch base 1 of a construction such as has been previously described. The manner of mounting the insulators and of rotating the insulator 7 is the same as in the case of the switch shown in Figure 1.

A frame 210 is supported on one end of the insulator 6 and at the other end upon the rotatable insulator 7, a suitable bearing being provided between the frame 210 and the insulator 7 whereby the frame does not impair rotation of the insulator. A crank 212 is rigidly mounted upon a stud 213 that rotates with the insulator 7, whereby the crank is also rotated with the insulator. The opposite end of the crank 212 is pivoted to a link 215 intermediate the ends thereof by means of a pin 216. This link comprises an upper arm portion 217 and a lower arm portion 218 both of which are rigidly connected together by means of the pin 216 so that the arms 217 and 218 operate as a rigid body. The arm 218 is pivoted to a link 220 by means of a pin 221. The opposite end of the link 220 is pivoted to the frame 210 by means of a pin 223 whereby the link 220 is permitted only swinging movement in an arc of a circle having its center at 223. The free end of the arm 217 is pivotally connected to an actuating arm 225 by means of a pin 226. The arm 225 corresponds to the arm 25 of the switch shown in Figure 1.

A switch blade 230 is pivoted to the support 210 by means of a pin 231 which also acts as a pivot pin for a blade lever 233. There is a pivotal connection between the arm 225 and the lever 233 by means of a clevis and a pin 234. The blade lever 233 is pivotally connected to the pull rod 235 which in turn is pivotally connected to a cam lever 236 by means of a clevis 237 and a pin 238. The cam lever is pivoted to the blade 230 by means of a pin 240 and is provided with a downwardly projecting portion 241 having a cam surface 242 which is adapted to exert a camming action on the base of the terminal lug mounted on the cap of the insulator 5 to exert a powerful camming effect to force the contacting end of the switch blade upward and to break any bind that may exist between the main contacts.

The switch contacts may be of any preferred construction, preferably of the floating type as illustrated in connection with the switch of Figure 1. The contact shoes are adapted to embrace a stationary contact finger 245 that is mounted on the cap of the insulator 5. They are mounted within a hood 246 in the same manner as are the contact shoes of the switch of Figure 1. The hood and the contact shoes within it are mounted upon the arms 247—247 of the blade 230 to swing integrally therewith. The hood 246 comprises a box-like structure which is open at the bottom to permit it to be moved over the stationary contact finger 245.

To actuate the switch the rotary insulator 7 is rotated to rotate the crank 212 in a clockwise direction as seen in Figure 12. As the pivot pin 216 moves under the action of the crank 212 it causes the arm 218 of the link 215 to force the link 220 to move in a counterclockwise direction as seen in Figure 12, causing the pin 221 to move away from the axis of rotation of the rotary insulator. The link 215 therefore has a compound motion imparted thereto by the combined action of the crank 212 and the arm 220, the link rotating about the axis of the insulator 7 under the action of the crank 212 while it is being turned about its moving pivot 216 by the arm 220. The net effect of this motion is to move the pin 226 in substantially a straight line in a direction extending from the insulator 6 to the insulator 7, the path of motion being indicated by the dot-dash line L. The rod 225 is therefore pulled substantially axially of itself and therefore exerts no side thrust upon the blade lever 233 or upon the stationary insulator 6. The pull on the blade lever 233 is transmitted to the pull bar 235 and first causes a clockwise rotation of the cam lever 236 about the pivot pin 240. This initial turning movement of the cam lever causes the cam surface 242 to ride on the structure on the cap of the insulator 5 and exert a powerful camming effect to force the blade 230 upwardly. This camming action is effective to break any bind that may exist between the contact shoes and the cooperating contact finger 245. After a limited amount of this movement the upper lever of the cam abuts against the blade 230, thus preventing further relative swinging between the cam 236 and the blade 230. A further pull upon the pull rod 235 is effective to swing the blade 230 about its pivot 231 to the switch open position. During the opening operation an arcing horn 252, which is mounted upon the housing 250, cooperates with an arcing horn 253 to prevent arcing between the relatively moving main contacts.

The closing operation of this switch is substantially the reverse of the opening operation. The actuating insulator is rotated in the reverse direction and actuates the various links in the reverse direction. The cam lever 236 is turned about its pivot until it engages the blade 230 and thereafter it is swung, together with the blade, to the switch closed position. A stop is provided for limiting the relative movement of the cam 236 with respect to the blade, in this direction. This stop comprises merely a rearward projecting portion of the cam, such projecting portion abutting against the blade 230.

Figure 13:
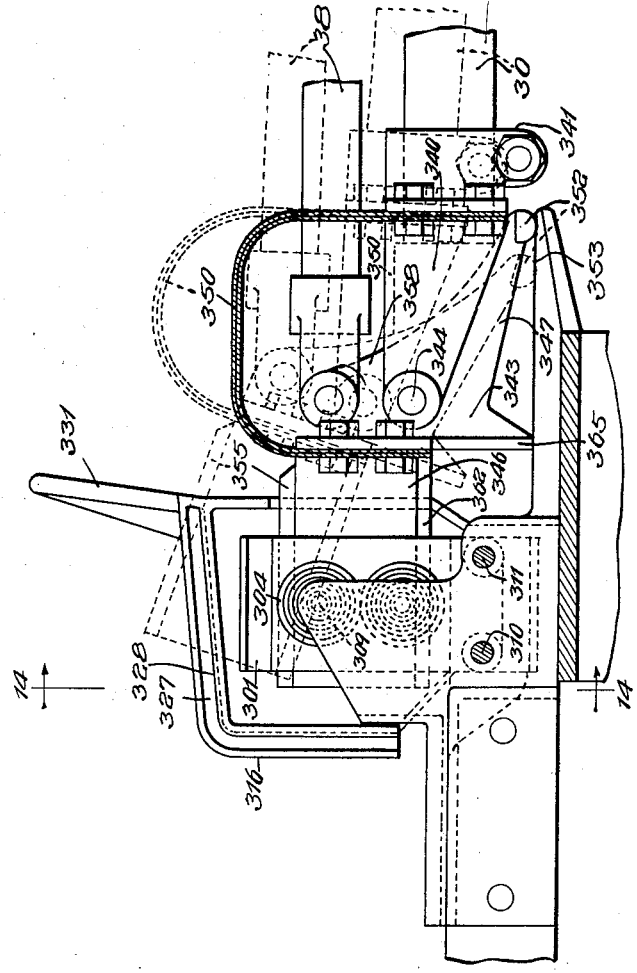
Figure 13 is a fragmentary sectional view showing a portion of a somewhat modified form of switch having a contacting portion hinged at the end of the blade and employing a different form of sleet hood.
Figure 14:
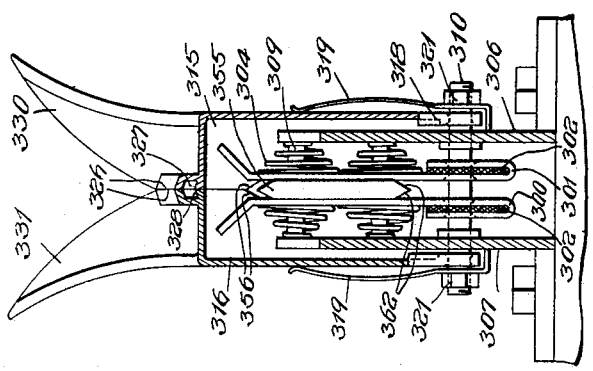
Figure 14 is a sectional view taken along the line 14—14 of Figure 13.

Reference may now be had to Figures 13 and 14, which show a portion of a modified form of switch. In these figures I show only a portion of a switch, said portion corresponding to the portion of the switch of Figure 1 that is shown in Figures 4 and 5. The rest of this switch is of a construction such as shown in Figure 1. The stationary contact, which is mounted upon an insulator as in Figure 1, comprises a pair of contact members indicated at 300 and 301, said contact members being outwardly flared adjacent the upper end and being bent back at the bottom and compressed upon a flexible braid 302 of copper or the like. These blades are normally urged against one another when the switch is open, being retained in position by means of coiled springs 304. The contact shoes 301 and 302 are of a construction substantially identical to the contact shoes mounted upon the switch blade of the switch of Figure 1. In this case the contacts are, however, mounted upon the stationary structure instead of upon the movable structure, and they are therefore mounted in the reverse position from that shown in Figures 4 and 5. The stationary contact structure includes a pair of stationary supporting arms 306 and 307 that support the contact shoes 301 and 302 and also support a protecting housing which will be more fully described as the description proceeds. The supporting arms 306 and 307 support the springs 304 and are provided with short guiding studs 309 for holding the springs in place. A set of pins 310 and 311 are passed through openings in the arms 306 and 307 and also extend through openings in the lower portion of the contact shoes. The pins are rigidly secured to the arms. The openings in the contact shoes are of slightly greater diameter than the diameter of the pins passing therethrough, whereby the contact shoes are permitted a limited amount of free movement in any direction to permit them to properly engage the movable contact making member that will be presently described.

A sleet hood comprising two similar hood members 315 and 316 is mounted on the supporting arms 306 and 307 by means of the pins 310 and 311. For this purpose the sleet hood members are provided with openings through which the pins are passed. These openings are of a slightly larger diameter than the diameter of the pins and are provided with well rounded corners. As a result, the two members 315 and 316 are permitted a limited amount of swinging movement, towards and away from each other, as seen in Figure 14. The sleet hood members are normally urged into engagement with one another by a pair of springs 319—319. Nuts 321—321 are provided for holding the sleet hood members upon the pins and for adjusting the tension upon the spring members. The two sleet hood members abut against one another, thus providing a complete enclosure for the stationary contact shoes and for the portion of the movable contact that is in engagement with the contact shoes. The top of the sleet hood is downwardly and rearwardly inclined, so as to provide suitable drainage for moisture. The rear of the sleet hood encloses the entire rear side of the contact structure, while the front portion of the sleet hood is also substantially entirely closed, partly by the hood itself and partly by the movable contact structure. The two sleet hood members abut against one another along the line 326—326, as seen in Figure 14. Most of the moisture that may fall upon the top of the housing will be drained therefrom due to the slope thereof. However, a small amount of moisture may creep along the abutting surfaces of the two sleet hood members and thus get into the housing. To prevent this small amount of moisture from entering the contact structure I provide a drain 327 for trapping this moisture and draining it away from the contacts. The drain 327 consists merely of a trough immediately below the top of the abutting edges of the two sleet hood members. The side edge of the bottom of the trough 327 is elevated, as may be seen at 328 in Figure 14, whereby any moisture that may enter the trough will be guided away from the edge thereof and will flow in the trough along the top of the housing and down the rear side thereof. The bottom of the trough is located at the rear of the housing and is open, whereby moisture may flow outward therefrom quite freely.

The two sleet hood members are provided with upward and outwardly flaring guiding members 330 and 331 for guiding the switch blade into position. As the blade moves downward between these guiding members during the switch closing operation it is accurately centered with respect to the contact shoes and it forces the two sleet hood members apart. After the switch blade has entered the housing the two sleet hood members are again closed by the springs 319—319 thereby completely enclosing the main contacts.

The movable contact structure is mounted upon the switch blade 30 which is actuated by the pull rod 38. The mounting of the switch blade and the manner of actuating the pull rod 38 are both identical to that shown in connection with the switch of Figure 1 and need not be here repeated. The contact structure which is mounted upon the end of the switch blade 30 is of a somewhat different construction from that previously described and will now be more fully set forth. A bifurcated member 340 is clamped or otherwise rigidly secured to the blade 30 by means of a split clamp 341. A switch blade and cam member 343 is pivoted between the arms of the forked member 340 by means of a pin 344. The member 343 comprises a cam 347 at one end thereof and a contact making portion 346 at the other end thereof, said cam and contact making portion comprising a rigid body. The cam may be cast integrally with the contact portion or the two may be separate parts bolted together to form a unitary structure. A flexible braided copper conductor 350 connects the contact 346 with the blade portion 30, thereby relieving the hinge pin 344 of duty as a current carrying member. The cam portion 347 fits rather closely between the arms of the forked member 340 thereby affording an accurate guide for maintaining the contact 346 in alignment with the blade 30. The top of the forked member 340 is preferably closed for a major portion of its length by means of a closing web 350. This closing web serves a two-fold purpose. First, it prevents the entrance of moisture into the space between the two arms of the forked member thereby preventing the cam member from being frozen to the forked member. Secondly, this web member constitutes a stop for limiting the extent of permissible swinging movement of the cam member in either direction.

Assume that it is desired to open the switch. A pull is exerted upon the pull rod 38 in a manner such as has been previously pointed out in connection with the switch shown in Figure 1. The cam and contact member are thereby caused to turn about the pin 344. The cam member 347 is provided with a cam surface 352 which rides along the top of the stationary structure 353 and thereby forces the pin 344, and with it the blade 350, to move upward a slight amount. During this turning motion the contact 346 is sheared out of the grip of the contact shoes 300 and 301, this shearing action being effective to break any bind that may exist between the contact and the contact shoes. It is to be noted that the upper edge of the contact 346 is wedge shaped as indicated at 355. As the contact 346 is being turned about its pivot pin 344 this wedge shaped portion engages the front side of the two sleet hood members and forces the two members apart. To facilitate this action the lower edges of the front opening of the sleet members are tapered as indicated at 356—356 (Figure 14). After a predetermined amount of movement of the contact member with respect to the switch blade 30 the edge 358 of the cam member 347 abuts against the web 359 and thereby prevents further relative movement between the contact and the blade. Further movement of the pull rod 38 causes the contact 346 and the blade 30 to swing as a unit about the pivotal support of the blade 30, all in the manner previously explained in connection with the switch of Figure 1.

During the closing operation of this switch the lower wedge shaped edge 362 of the contact 346 is guided into position by the two guiding members 330 and 331, the contact member forcing these members apart to permit entrance of the contact member into the sleet hood and into engagement with the contact shoes mounted therein. After the contact member has engaged the contact shoes it spreads them apart and moves into the position shown in Figure 14. A shoulder 365 limits the extent of downward movement of the switch blade.

Reference may now be had more particularly to Figures 15 and 16 showing the contacting portion of a switch of a construction similar to the switch shown in Figures 13 and 14 but differing therefrom mainly in that in this switch the contact making portion is rigid with respect to the blade and a separate cam is provided for effecting the powerful camming action to separate the contact from the contact shoes. In this form of switch the stationary contact structure and the sleet hood are both of a construction substantially identical to that of the switch previously described. The movable contact structure comprises a contact member 375 which is secured to the blade 30 in any desirable manner to be rigid therewith. The contact structure includes a split portion 376 wherein there is pivoted a cam 377 by means of a pin 378. The cam 377 includes an outwardly extending portion 380 to which the pull rod 38 is pivotally connected by means of a pin 381 and a clevis 382. The cam member extends through the part 376 and is limited in its swinging movement in one direction by means of a stop 385 which engages the edge of the slot at 386, and it is limited in its swinging motion in the opposite direction by means of a shoulder 388 which engages the bottom of the blade gripping portion of the contact 375. The cam portion 377 bears against an inclined upwardly projecting cam surface 390 integral with the stationary supporting structure. When a pull is exerted upon the pull rod 38 the cam pivots about the pin 378 and as the cam surface 377 rides upon the surface 390 it exerts a powerful camming action to force the pin 378 upward to separate the contact 375 from the contact shoes. When the cam reaches its limit of motion, that is, when the shoulder 385 abuts against the end of the slot indicated at 386, a further pull upon the pull rod 38 will cause the cam and the switch blade 30 to swing as a rigid unit about the pivotal blade mounting in the manner of operation of the switch shown in Figure 1 and previously described. The closing operation of this switch is substantially the same as that of the switch shown in Figures 13 and 14 previously described.

In Figures 17 and 18 I show a stationary and a movable contact structure which are adapted to be used on a switch of the kind shown in Figure 1. The blade 30 has a contact carrier 401 secured thereto in any preferred manner, as by means of a split collar 402 and a bolt 403. The contact supporting structure 401 includes a pair of arms 405 and 406 for supporting the contact shoes, and a pair of arms 408 and 409 for supporting a cam member 410. The female contact is mounted between the arms 405 and 406 of the contact carrier, being mounted in substantially the same manner as are the contact shoes of the switch shown in Figure 1. A pair of pins 415—416 extend through the arms 405 and 406 and through the contact shoes, the openings in the contact shoes being well rounded at their edges in order to permit a limited amount of universal movement of the contact shoes about their supporting pins. Springs 418 are provided for urging the contact shoes toward one another and into firm engagement with the stationary contact finger. The pins 415—416 may be held against withdrawal by means of suitable cotter pins.

The two spaced arms 408—409 extend upwardly from the collar portion of the support 401 and embrace the cam member 410, said cam member being pivoted between those arms by means of a pin 411. The pull rod 38 extends between the arms 408 and 409 and is pivotally connected to the cam 410 by means of a clevis 420 and a pin 421. It is to be noted that this form of switch is not provided with a hood for enclosing the contact structure. For this reason the various parts have been made more rugged than is required in the form of switch that is provided with a sleet hood.

The stationary contact structure includes a base member 440 having a pair of side flanges 441 and 442 that are joined together by a web portion 443 from which the stationary contact finger 444 extends. The contact finger 444 has a number of diagonal grooves 445 formed on the opposite sides thereof for collecting any foreign matter that may be scraped from the surfaces of the main contacts as they move into engagement with one another. To facilitate this action the grooves are provided with sharp edges. The grooves on the two sides of the contact slope in opposite directions. A pair of side guides 446 and 447 are bolted or otherwise suitably secured to the side flanges of the contact member. In the particular embodiment of my invention herein shown for illustrative purposes the side guides are secured to the flanges by means of two bolts 450—450 and a stay bolt 451 that is locked in place by means of two sets of lock nuts indicated at 452—452. The guiding members 446 and 447 are provided with outwardly flared guiding edges 456 and 457 for guiding the contact carrying arms 405 and 406 of the contact supporting structure 401 into position. To facilitate this guiding action the bottom portions of the arms are provided with outwardly extending knob portions 458 which will ride along one or the other of the two surfaces 456 or 457 during the switch closing operation in the event that the switch blade is slightly displaced to one side or the other of the contact finger 444. This will bring the contact structure into substantial alignment with the contact finger and the outwardly flared portions 460 will accurately guide the contact shoes over the contact finger. A stop member 463 is formed integrally with the contact supporting structure 401 and abuts against the contact base 440 for limiting the extent of movement of the switch blade in the switch closing direction.

To actuate the switch blade of Figures 17 and 18 to the open position a pull is exerted upon the pull rod 38. The mechanism for exerting the pull may be the same as the mechanism shown in connection with the switch of Figure 1. As the pull rod 38 moves to the right, as seen in Figure 17, it causes the cam member 410 to pivot about its pin 411 in a generally counterclockwise direction. The cam member abuts against the top of the contact finger 444 and the cam therefore swings as a lever of the second class. It fulcrums about the stationary contact 444 and forces the pivot point 411 to move upward, thereby drawing the arm 408 and the switch blade 30 in an upward direction. The cam exerts a powerful action upon the stationary contact to produce this initial switch opening movement and it is effective to break any bind that may exist between the contact shoes and the stationary contact finger. As the switch blade continues to move in its open direction under the camming action of the cam 410 against the contact finger the cam continues to turn about its pivot 411 and ultimately a projecting finger 465, formed integrally with the cam structure, abuts against an abutting web 466 of the contact supporting structure 401 and limits further movement of the cam with respect to the blade. Upon the continued exertion of a pull upon the pull rod 38 the cam, together with the blade 30, swing as an integral unit in a manner such as previously set forth in connection with the switch of Figure 1.

During the closing operation of the switch shown in Figures 17 and 18 the projecting finger 465 is moved into abutment with a wall 467 opposite to the web 466 which limits the extent of turning movement of the cam about its pivot.

In compliance with the requirements of the patent statutes I have herein shown and described a few preferred forms of my invention. It is, however, to be understood that the invention is not limited to the precise construction herein set forth, the same being merely illustrative.

What I consider new, and desire to secure by Letters Patent is:

1. A switch including a switch blade having a pivotally mounted sleet hood, said hood being open at the rear, a movable cam member extending into the hood, and means on the cam for substantially closing the rear opening in the hood.

2. A switch including a switch blade having a pivotally mounted sleet hood, said hood being open at the rear, a movable cam member extending into the hood, and means on the cam for substantially closing the rear opening in the hood, said hood being free of interference by the closing means as the hood swings about its pivot, and resilient means for biasing the hood to a predetermined pivoted position.

3. A switch including a stationary contact, a blade having contact making means cooperating with the contact, a sleet hood pivoted on the blade and normally urged to a position overlying the contact making means, means adjacent the stationary structure for swinging the hood out of its normal position to permit engagement of the contact, and means associated with said last named means for adjusting the extent of swinging of the hood, said hood embracing both the contact and the contact making means when it is swung into position by said hood swinging means.

4. A switch blade including a hood receiving portion, a hood pivotally mounted thereon by means including a mounting pin, spring means surrounding said pin and extending between the hood and the hood receiving portion for biasing the hood to a certain position and means on the hood receiving portion for holding the spring in place during the assembly of the hood on the hood receiving portion prior to the insertion of the mounting pin.

5. A switch blade including a hood receiving portion, a hood pivotally mounted thereon by means including a mounting pin, spring means surrounding said pin and extending between the hood and the hood receiving portion for biasing the hood to a certain position and means on the hood receiving portion for holding the spring in place during the assembly of the hood on the hood receiving portion prior to the insertion of the mounting pin, said means comprising a boss on the outside of the hood receiving portion at the point where the hood is pivoted.

6. A conducting switch blade having a bifurcated contact supporting portion, a pair of contacts resiliently mounted between the two arms of the bifurcated support and urged towards one another, and a hood enclosing the contacts and the arms.

7. A conducting switch blade having a bifurcated contact supporting portion, a pair of contacts resiliently mounted between the two arms of the bifurcated support and urged towards one another, means including a pin extending through the bifurcated structure and the contacts for supporting the contacts, and a sleet hood pivotally mounted on the pin and enclosing said contacts and said arms.

8. A switch including a stationary contact structure, a switch blade mounted at one end and including at its opposite end contact making means adapted to cooperate with the contact structure, a cam member pivotally mounted upon the blade adjacent the contact making means and cooperating with the contact structure to force the blade away from the contact structure, a sleet hood carried by the blade, said cam member swinging partly within and partly outside of the sleet hood, and means adjacent the mounted end of the blade for actuating the cam member to actuate the blade.

9. A disconnect switch including three spaced insulators, a contact supported on one of the insulators, bracing means between the other two insulators and supporting a pivoted switch blade, one of said two insulators being rotatable, a crank member rotated by the rotatable insulator for actuating the blade, link mechanism for translating the rotary motion of the crank into a substantially straight line motion extending substantially within the plane of movement of the blade, and a connecting rod one end of which is connected to actuate the blade and the other end of which is actuated in a straight line by said link mechanism.

10. A switch having a stationary contact structure comprising a pair of arms, contacts resiliently mounted between said arms, sleet hood members pivotally mounted outside of the arms, and means for urging the sleet hood members towards one another to enclose the contacts.

11. A switch having a contact, a support therefor, a pair of sleet hood members for the contact, said sleet hood members being mounted on the contact support and movable into and out of engagement with one another, and a drain trough adjacent the engaging portions of the hood members.

12. A switch having an insulated support and mounted thereon a sleet hood comprising a plurality of pivotally mounted parts movable into and out of abutting engagement with one another, and drainage means adjacent the engaging portions of said hood parts.

13. A switch having a contact, a support therefor and a sleet hood mounted on the support and embracing said contact, said hood comprising two relatively movable members biased to a position of abutment with one another for enclosing the contact, the outside of the members being arranged to exclude moisture at the abutment of the two members, and a water trough immediately under the abutting edges for collecting any moisture that may seep through the abutting edges.

14. A switch having a contact structure comprising a pair of oppositely disposed arms, a pair of contact shoes mounted on the inner sides of the respective arms and resiliently urged towards one another, said contact shoes being adapted to receive a contact between them, and a sleet hood comprising two movable members mounted on the outer sides of said arms and biased to a position in abutment with one another and enclosing the contact shoes.

15. A switch having a contact structure comprising a pair of oppositely disposed arms, a pair of contact shoes mounted on the inner sides of the respective arms and resiliently urged towards one another, said contact shoes being adapted to receive a contact between them, a sleet hood comprising two movable members mounted on the outer sides of said arms and biased to a position in abutment with one another and enclosing the contact shoes, and a bolt extending through said arms, contact shoes, and sleet hood members for limiting the extent of movement of the contact shoes and sleet hood members.

16. A switch comprising a stationary contact and a movable contact movable into and out of engagement with one another, one of said contacts comprising a contact finger and the other comprising a pair of contact shoes adapted to receive the contact between them, guiding means spaced from the contact shoes, and additional guiding means spaced from the contact finger and cooperating with said first named guiding means for guiding the sets of contacts into engagement.

17. A switch comprising a stationary contact and a movable contact movable into and out of engagement with one another, one of said contacts comprising a contact finger and the other comprising a pair of contact shoes adapted to receive the contact between them, guiding means spaced from the contact shoes, and additional guiding means spaced from the contact finger and cooperating with said first named guiding means for guiding the sets of contacts into engagement, said first named guiding means being within the second named guiding means when the switch is closed.

18. A switch including a contact member and a pair of relatively movable semi-hood members together enclosing the contact member, spring means urging the hood members into abutting relation to enclose the contact, and means comprising a portion of the semi-hood members for trapping moisture that may creep between the abutting edges of the hood members.

19. A switch including a blade having a bifurcated contact supporting portion, a pair of contact making members resiliently mounted between the two arms of the bifurcated contact supporting portion and urged towards one another, a contact receivable between the contact making members, and pry loose means mounted between the two arms of the contact supporting portion for prying the contact making members from the contact.

20. A switch comprising a relatively long switch blade pivoted at one end, a relatively short contact making member pivoted on the other end of the blade, a pull rod pivoted to the contact making member for swinging the contact making member about its pivot on the blade, and abutment means between the contact making member and the blade for limiting the relative movement between the two and swinging the blade about its own pivot upon continued pull of the pull rod.

21. A switch comprising a relatively long switch blade pivoted at one end, a relatively short contact making member pivoted on the other end of the blade, a contact adapted to be engaged by the contact making member, a pull rod pivoted to the contact making member for swinging the contact making member about its pivot on the blade, pry loose means comprising an integral part of the contact making member for prying it loose from the contact, and abutment means between the contact making member and the blade for limiting the relative movement between the two and swinging the blade about its own pivot upon continued pull of the pull rod.

22. A switch comprising a relatively long switch blade pivoted at one end, a relatively short contact making member pivoted on the other end of the blade, a contact adapted to be engaged by the contact making member, a pull rod pivoted to the contact making member for swinging the contact making member about its pivot on the blade, pry loose means comprising an integral part of the contact making member for prying it loose from the contact, abutment means between the contact making member and the blade for limiting the relative movement between the two and swinging the blade about its own pivot upon continued pull of the pull rod, actuating means having a continuous motion for actuating the rod to actuate the contact making member and then to swing the blade about its pivot to switch open position, said actuating means comprising a crank movable about an axis at right angles to the axis of swing of the blade, a connecting rod actuated by the crank and actuating the pull rod, and means for preventing the pull rod from transmitting a twisting force to the blade as the angularity between the connecting rod and the plane of movement of the blade increases.

PEDER B. HOYE.